Patented Apr. 30, 1935

1,999,728

UNITED STATES PATENT OFFICE 1,999,728

MANUFACTURE OF LEAD STYPHNATE

Edmund Herz, Berlin-Charlottenburg, Germany, assignor to Remington Arms Company, Inc., a corporation of Delaware No Drawing. Application February 27, 1928, Serial No. 257,546. In Germany November 8, 1927

10 Claims. (Cl. 260—11)

This invention relates to the manufacture of certain chemical compounds, particularly compounds of an explosive nature, such as the normal lead salt of trinitroresorcine. This acid will hereinafter be called by its common name of "styphnic acid" and its salts will be referred to as "styphnates." More particularly, the invention has to do with the discovery of hitherto unknown properties of magnesium styphnate and its solutions, and mixtures of such solutions with styphnic acid.

It is one object of the invention to utilize these newly discovered properties of magnesium styphnate in the manufacture of lead styphnate, utilizing novel methods which greatly cheapen the manufacture of lead styphnate, as well as render it more safe and efficient.

Further objects of the invention will appear from the following description.

Normal lead styphnate finds an extensive use in the explosives industry, particularly as an ingredient of priming and detonating compositions, and for these purposes its economical and efficient manufacture is of great importance. Prior to the present invention, lead styphnate had been universally produced by the reaction of a hot solution of lead nitrate and a solution of one of the more soluble alkali metal or alkali earth metal salts of styphnic acid, the latter solution being slightly acidified with acetic acid. For this purpose the sodium salt only has been capable of actual use; other salts, such as the potassium, ammonium and calcium salts, being too difficulty soluble.

Moreover, the use of the sodium salt presents substantial difficulty, entailing a cumbersome and inefficient manufacturing process and a large amount of bulky and expensive equipment. Difficulties arise first from the comparatively small solubility of the sodium salt and second from the necessity for acidifying its solution with acetic acid. The sodium salt is soluble only to the extent of one part in about 28.5 parts of water at 20° C. Thus, it is impracticable to prepare and store solutions having a concentration greater than about 3%. In actual commercial manufacture it is impracticable to prepare a fresh solution for each precipitation operation, and the storing of large quantities of the weak solution requires tanks of large capacity and a large amount of heating apparatus to prevent crystallization of the salt from solution in cold weather. Any failure of the heating apparatus resulting in such crystallization requires the scrapping of a large amount of expensive material and expensive cleaning and reconditioning of the apparatus.

According to the present invention, all of these difficulties are obviated by the utilization of newly discovered properties of magnesium styphnate. It has been found that this salt has a solubility of an order far removed from any of the previously known and used salts of styphnic acid. One part of this salt dissolves in 1.7 parts of water at 20° C., and the salt does not crystallize at freezing temperatures from solutions having a concentration from 25% to 30%. Thus, highly concentrated solutions can be stored, without any heating equipment whatever, even in very cold weather, and the capacity of storage tanks is very greatly reduced. In actual practice the capacity of a single precipitation unit is increased three to five times.

The preparation of magnesium styphnate is simple. Cold water is applied to the necessary quantity of styphnic acid and into this solution is stirred the requisite amount of magnesium oxide or magnesium carbonate; in some respects magnesium oxide is preferable. The resulting solution of magnesium styphnate is ready for use, after filtration.

An additional concept of the invention includes the elimination of the acid, such as acetic acid, which, under the methods of making lead styphnate in vogue hitherto, has been essential to the securing of a properly crystallized product. It has been found that the use in the magnesium or other styphnate solution of a slight excess of styphnic acid accomplishes the same purpose. The precipitate is in the form of dense crystals of reasonably uniform shape and size. While it is impracticable to demonstrate the reason for this result, it is believed to be due to the formation of a small quantity of an acidic salt of styphnic acid. The best results are secured when the excess of styphnic acid is between ½% and 5%, and it has been found that the excess should be varied according to the concentration of the solution. The practice of using such an excess of styphnic acid is applicable to previously known processes as well as to the process involving the use of magnesium styphnate as disclosed herein.

Salts of styphnic acid having a solubility greater than about 3% at ordinary temperatures having been unknown prior to the present invention, and the control of the reaction characteristics of a solution of any salt of styphnic acid by providing an excess of such acid being entirely new, the appended claims are to be broadly construed.

What is claimed is:

1. The method of making lead styphnate which comprises precipitating said salt in the presence of free styphnic acid.

2. The method of controlling the precipitation of salts of styphnic acid which comprises effecting such precipitation in the presence of free styphnic acid.

3. In the manufacture of lead styphnate, the method which comprises precipitating said lead salt from a solution of another salt of styphnic acid in the presence of free styphnic acid.

4. The method of controlling the precipitation of salts of styphnic acid which comprises effecting such precipitation in the presence of ½% to 5% of free styphnic acid.

5. In the manufacture of lead styphnate, the method which comprises precipitating said lead salt from a solution of magnesium styphnate in the presence of free styphnic acid.

6. The method which comprises the preparation of lead styphnate by the interaction of a solution of magnesium styphnate with a solution of lead nitrate.

7. The method which comprises the preparation of lead styphnate by the interaction of a substantially 30% solution of magnesium styphnate with a solution of lead nitrate.

8. The method which comprises the preparation of lead styphnate by the interaction of a concentrated solution of magnesium styphnate with a solution of lead nitrate in the presence of free styphnic acid.

9. The method which comprises the preparation of lead styphnate by the interaction of a solution of lead nitrate with a solution of magnesium styphnate having a concentration up to 30%.

10. The method which comprises the preparation of lead styphnate by the interaction of a solution of magnesium styphnate with a solution of a lead salt.

EDMUND HERZ.